United States Patent
Hossein-Zadeh et al.

(10) Patent No.: US 7,951,299 B2
(45) Date of Patent: May 31, 2011

(54) METHOD OF FABRICATING A MICRORESONATOR

(75) Inventors: Mani Hossein-Zadeh, Pasadena, CA (US); Kerry J. Vahala, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 752 days.

(21) Appl. No.: 12/034,895

(22) Filed: Feb. 21, 2008

(65) Prior Publication Data
US 2008/0203052 A1   Aug. 28, 2008

Related U.S. Application Data

(60) Provisional application No. 60/903,773, filed on Feb. 27, 2007.

(51) Int. Cl.
*B44C 1/22* (2006.01)
(52) U.S. Cl. .................. 216/2; 216/24; 216/79
(58) Field of Classification Search .............. None
See application file for complete search history.

(56) References Cited

U.S. PATENT DOCUMENTS

| | | | |
|---|---|---|---|
| 3,589,794 A | 6/1971 | Marcatili | |
| 3,760,297 A | 9/1973 | Thompson et al. | |
| 3,913,126 A | 10/1975 | Hooker et al. | |
| 4,282,499 A | 8/1981 | DeFonzo | |
| 4,695,121 A | 9/1987 | Mahapatra et al. | |
| 5,343,490 A | 8/1994 | McCall | |
| 5,651,022 A | 7/1997 | Anthon et al. | |
| 5,878,070 A | 3/1999 | Ho et al. | |
| 6,052,495 A | 4/2000 | Little et al. | |
| 6,078,605 A | 6/2000 | Little et al. | |
| 6,101,300 A | 8/2000 | Fan et al. | |
| 6,222,964 B1 | 4/2001 | Sadot et al. | |
| 6,259,717 B1 | 7/2001 | Stone et al. | |
| 6,541,295 B1* | 4/2003 | Looney | 438/29 |
| 6,741,628 B2 | 5/2004 | Painter et al. | |
| 6,901,101 B2 | 5/2005 | Frick | |
| 7,515,617 B1* | 4/2009 | Vahala et al. | 372/21 |
| 7,545,843 B2* | 6/2009 | Armani et al. | 372/92 |
| 7,616,850 B1* | 11/2009 | Watts et al. | 385/32 |
| 7,781,217 B2* | 8/2010 | Armani et al. | 436/57 |
| 7,820,970 B1* | 10/2010 | Shaw et al. | 250/338.1 |

(Continued)

FOREIGN PATENT DOCUMENTS

FR   2 703 473   10/1994

(Continued)

OTHER PUBLICATIONS

Gayral, B. et al., "High-Q wet-etched GaAs microdisks containing InAs quantum boxes", *Applied Physics Letter*, vol. 75 (13), pp. 1908-1910, (1999).

(Continued)

*Primary Examiner* — Allan Olsen
(74) *Attorney, Agent, or Firm* — Connolly Bove Lodge & Hutz LLP

(57) ABSTRACT

A method of fabricating a microresonator is disclosed. Initially, silica is deposited on a substrate, and the substrate is etched to form a pillar, the top portion of which supports the silica. The microresonator is then formed from the silica. Next, the pillar is etched to reduce the overall diameter of the top portion of the pillar so that the microresonator can be disengaged from the pillar.

30 Claims, 4 Drawing Sheets

U.S. PATENT DOCUMENTS

| | | | |
|---|---|---|---|
| 2002/0018611 A1 | 2/2002 | Maleki et al. | |
| 2003/0021518 A1 | 1/2003 | Smirnov et al. | |
| 2004/0179573 A1 | 9/2004 | Armani et al. | |
| 2005/0169331 A1 | 8/2005 | Vahala et al. | |
| 2007/0269901 A1* | 11/2007 | Armani et al. | 436/172 |
| 2009/0097031 A1* | 4/2009 | Armani et al. | 356/437 |
| 2010/0085573 A1* | 4/2010 | Lu et al. | 356/480 |

FOREIGN PATENT DOCUMENTS

| | | |
|---|---|---|
| JP | 05203826 | 8/1993 |
| WO | WO-98/05995 | 2/1998 |

OTHER PUBLICATIONS

Gerard, J.M., et al., "Quantum boxes as active probes for photonic microstructures: the pillar microcavity case", *Applied Physics Letters*, vol. 69, pp. 449-451 (1996).

Gorodetsky, M.L., et al. "Ultimate Q of optical microsphere resonators", *Optics Letters*, vol. 21, pp. 453-455 (1996).

Vernooy, D.W., et al., "High-Q measurements of fused-silica microspheres in the near infrared", *Optics Letters*, vol. 23, pp. 247-249 (1998).

Cai, M., et al., "Observation of critical coupling in a fiber taper to a silica-microsphere whispering-gallery mode system", *Physical Review Letters*, vol. 85, pp. 74-77 (2000).

Spillane, S.M., et al., "Ultralow-threshold Raman laser using a spherical dielectric microcavity", *Nature*, vol. 415, pp. 621-623 (2002).

Michler, P., et al., "quantum dot lasers using high-Q microdisk cavities", *Physica Status Solidi B—Basic Research*, vol. 224, pp. 797-801 (2001).

Cai, M., et al., "Fiber-coupled microspher laser", *Optics Letters*, vol. 25, pp. 1430-1432 (2000).

McCall, S.L., et al., "Whispering-Gallery Mode Microdisk Lasers", *Applied Physics Letters*, vol. 60, pp. 289-291 (1992).

Sandoghdar, V., et al., "Very low whispering-gallery-mode microsphere laser", *Physical Review A*, vol. 54, pp. R1777-R1780 (1996).

Djordjev, K., et al., "Microdisk tunable resonant filters and switches", *Ieee Photonics Technology Letters*, vol. 14, pp. 828-830 (2002).

Rabiei Payam, W.H.S., et al., "Polymer Micro-Ring Filters and Modulators", *Journal of Lightwave Technology*, vol. 20, pp. 1968-1975 (2002).

Djordjev, K., Choi, et al., "Vertically coupled InP microdisk switching devices with electroabsorptive active regions", *Ieee Photonics Technology Letters*, vol. 14, pp. 1115-1117 (2002).

Yvariv, A., "Critical coupling and its control in optical waveguide-ring resonator systems", *Ieee Photonics Technology Letters*, vol. 14, pp. 483-485 (2002).

Soref, R.A., et al., "Proposed N-wavelength M-fiber WDM cross connect switch using activy microring resonators", *Ieee Photonics Technology Letters*, vol. 10, pp. 1121-1123 (1998).

Chu, S.T., et al., "An eight-channel add-drop filter using vertically coupled microring resonators over a cross grid", *Ieee Photonics Technology Letters*, vol. 11, pp. 691-693 (1999).

Little, B.E., et al., "Vertically coupled glass microring resonator channel dropping filters," *Ieee Photonics Technology Letters*, vol. 11, pp. 215-217 (1999).

Offrein, B.J., et al., "Resonant coupler-based tunable add-after-drop filter in silicon-oxynitride technology for WDM networks," *Ieee Journal of Selected Topics in Quantum Electronics*, vol. 5, pp. 1400-1406 (1999).

Von Klitzing, W., et al., "Tunable Whispering Gallery Modes for Spectrosocpy and CQED Experiments", *New Journal of Physics*, vol. 3, pp. 14.1-14.4 (2001).

Little, B.E., et al., "Microring resonator channel dropping filters", *Journal of Lightwave Technology*, vol. 15, pp. 998-1005 (1997).

Grover, R., et al., "Parallel-cascaded semiconductor microring resonators for high-order and wide-FSR filters", *Journal of Lightwave Technology*, vol. 20, pp. 872-877 (2002).

Yanagase, Y., et al., "Box-like filter response and expansion of FSR by a vertically triple coupled microring resonator filter", *Journal of Lightwave Technology*, vol. 20, pp. 1525-1529 (2002).

Krioukov, E., et al., "Sensor based on an integrated optical microcavity", *Optics Letters*, vol. 27, pp. 512-514 (2002).

Vollmer, F., et al., "Protein detection by optical shift of a resonant microcavity", (2002).

Bumki, M., et al., "Compact, fiber-compatible, cascaded Raman laser", *Optics Letters*, vol. 28 (17), (2003).

Kleppner, D., "Inhibited Spontaneous Emission", *Physical Review Letters*, vol. 47, pp. 233-236 (1981).

Yang, L., et al., "Fiber-coupled Erbium Microlasers on a chip", *Applied Physics Letters*, vol. 83 (5), pp. 825-826 (2003).

Kippenberg, S.M., et al., "Fabrication and coupling to planar high-Q silica disk microcavities", *Applied Physics Letters*, vol. 83 (4), pp. 797-799 (2003).

Yang, L., et al, "Gain functionalization of silica microresonators", (2003).

Schiller, S., et al., "fused-silica monolithic total-internal-reflection resonator", *Optics Letters*, vol. 17 (5), pp. 378-380 (1992).

Knight, J.C., "Phase-matched excitation of whispering-gallery-mode resonances by a fiber taper", *Optics Letters*, vol. 22 (15), pp. 1129-1131 (1997).

Yariv, A., "Universal relations for coupling of optical power between microresonators and dielectric waveguides", *Electronics Letters*, vol. 36 (4), pp. 321-322 (2000).

Little, B.E., et al., "Wavelength Switching and Routing Using Absorption and Resonance", *IEEE Photonics Technology Letters*, vol. 10 (6), pp. 816-818 (1998).

Chud, D., et al., "Observation of Enhanced Photoluminescence in Erbium-Doped Semiconductor Microdisk Resonator", *Applied Physics Letters*, vol. 66 (21), pp. 2843-2845 (1995).

Kawachi, M., "Silica Waveguides on Silicon and Their Application to Integrated-Optic Components", *Optical and Quantum Electronics*, vol. 22, pp. 291-416 (1990).

* cited by examiner

METHOD OF FABRICATING A MICRORESONATOR

PRIORITY

Priority is claimed under 35 U.S.C. §119 to provisional patent application Ser. No. 60/903,773, filed Feb. 27, 2007, the disclosure of which is incorporated herein by reference in its entirety.

STATEMENT REGARDING FEDERALLY SPONSORED RESEARCH

The U.S. Government has certain rights in this invention pursuant to Grant No. F33615-02-C-1184 HRL awarded by the Air Force.

BACKGROUND OF THE INVENTION

1. Field of the Invention

The field of the present invention is techniques for fabricating microresonators, particularly ultra-high Q optical microresonators which are detachable from the structures upon which they are initially fabricated to be freely positioned within a photonics circuit.

2. Background

Optical microring resonators (OMRs) are versatile elements for designing integrated photonic circuits, and can be used as building blocks for many optical signal processing devices and systems. OMRs can be employed in many different types of photonic circuits, including multipole add-drop filters, multistage dispersion compensators and delay lines, electro-optic modulators, lasers, nonlinear optical elements, and sensor applications. Currently the OMRs employed in most photonic devices are fabricated using traditional monolithic techniques using various material systems such as polymers, III-V semiconductors, Hydex™, SiN, and Si, among others. The quality factor of these OMRs is below $10^6$ and is mainly limited by the surface roughness of the sidewalls, which is dictated by a fundamental limitation for currently available etching techniques. Moreover the monolithic fabrication of these devices prevents post fabrication position tuning, thus resulting in device performance that is limited by the accuracy of the lithographical techniques. In the design of multipole filter and dispersion compensating elements, where the device performance is extremely sensitive to coupling factors, post fabrication position tuning can play a crucial role in achieving the desired response. In fact, some form of post fabrication tuning is currently used for final tuning of most multipole microwave and RF filters.

Ultra-high-Q (UH-Q) microtoroid silica resonators represent a distinct class of OMRs with Q factors in excess of 100 million. This exceptional quality factor is a result of employing a special fabrication process that generates surface tension induced smoothness on the resonator sidewalls. This chip-based and relatively simple fabrication process allows fast production of UH-Q microtoroids with relatively high yield. Unfortunately this special process limits the range of possible integration choices for these resonators. The $XeF_2$ dry etching and the $CO_2$ laser reflow process can damage the microstructures and the devices built in the vicinity of the microtoroid. Also the diameter of the silica microdisk shrinks down as it reflows to its final toroidal shape. After fabrication, microtoroids are physically perched atop a silicon pillar so those photonic devices that rely on coupling of these resonators to an integrated waveguide or their mutual coupling cannot be realized.

At the same time, the low intrinsic loss of UH-Q microtoroidal resonators makes them very attractive for applications where low loss, large circulating power, narrow bandwidth, and large dispersion are required. For example, by employing UH-Q microtoroids in multi-ring filters, bandwidths and insertion losses are possible that can outperform existing resonant optical filters. Such filters would be unprecedented in optics and have immediate applications for RF photonic signal processing and DWDM optical communication systems. Taper-coupled UH-Q microtoroids have also been shown capable of reaching exceedingly high-power transfer efficiencies in four port couplers. In another example, high quality factor has a crucial role in the operation of optical ring resonator based biosensors that have been the subject of research in recent years, and silica microtoroid sensors have been shown capable of boosting the sensitivity of the resonant optical sensors by many orders of magnitude. In yet another example, integration of microtoroidal resonators with existing microfluidic and biophotonic devices can result in functionalities that have not been realized using existing monolithic microresonators. Moreover it has been shown that microtoroidal resonators may be used as ultra-low threshold laser sources having very narrow linewidths—Raman, Erbium and Ytterbium lasers have been already demonstrated. Such lasers can considerably improve the functionality of existing photonic systems.

Furthermore, the combination of the low cavity losses, small mode volume, and relative ease of fabrication makes microtoroidal resonators promising candidates for cavity QED (cavity quantum electrodynamics) experiments. This use has manifested by the recent demonstration of strong coupling between individual cesium atoms and the field of a high-Q optical mode in a microtoroid. Generally, there is great interest in finding ways to realize on-chip, strongly coupled systems. In addition, the ability of building a network of coupled microtoroids creates a powerful platform for realizing new cavity QED experiments. The only substitute for silica microtoroid cavities are UH-Q crystalline microcavities, which have with optical Q factors above $10^{10}$. These resonators are fabricated using computer controlled mechanical grinding techniques and currently they can have diameters as small as 200 μm. However, between the complex fabrication techniques and the fact that these resonators are usually embedded in a crystalline rod, miniaturization and integration of crystalline resonators has not yet been realized. Microtoroids, on the other hand, already have the benefit of size on the order of tens of microns, leaving integration as one of the remaining challenges.

SUMMARY OF THE INVENTION

The present invention is directed toward a method of fabricating a microresonator. A silica layer is initially formed on a substrate, and the substrate is then etched to form a pillar. The top portion of the pillar supports the silica layer and is dimensioned smaller than the silica layer. A microresonator is then formed from the silica layer, and the pillar is further etched to reduce the overall diameter of the top portion of the pillar. Lastly, the microresonator is disengaged from the pillar, resulting in a free microresonator that may be placed, positioned, and incorporated into virtually any photonics circuit.

Within the framework of this method, many different options are available for the fabrication process. For example, the silica may be deposited onto a silicon substrate as a microdisk, and an XeF2 dry etching process may be used to etch the silicon without affecting the silica. The microdisk may then be irradiated and induced to form a microtoroid using known fabrication techniques.

The microresonator may be lifted off the pillar using one of the specialized tools described herein, or it may be lifted off the pillar by any other appropriate technique. For example, the tool my be in the form of a forked platform placed under the resonator, with the forks placed on either side of the pillar, and used to lift the microresonator off the pillar. Such a forked platform may be formed from silica. With the microresonator free of the pillar and resting upon the tool, the microresonator may be accurately positioned within any desirable photonics circuit.

Alternatively, a tool may engage the top side of the microresonator, preferably at the center membrane, to create a mechanical bond or connection between the tool and the microresonator. Through the bond, the microresonator may be lifted off the pillar. Preferably, any such mechanical bond or connection is easily undone so that the microresonator may be accurately positioned within any desirable photonics circuit.

Accordingly, an improved method for fabricating a microresonator is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
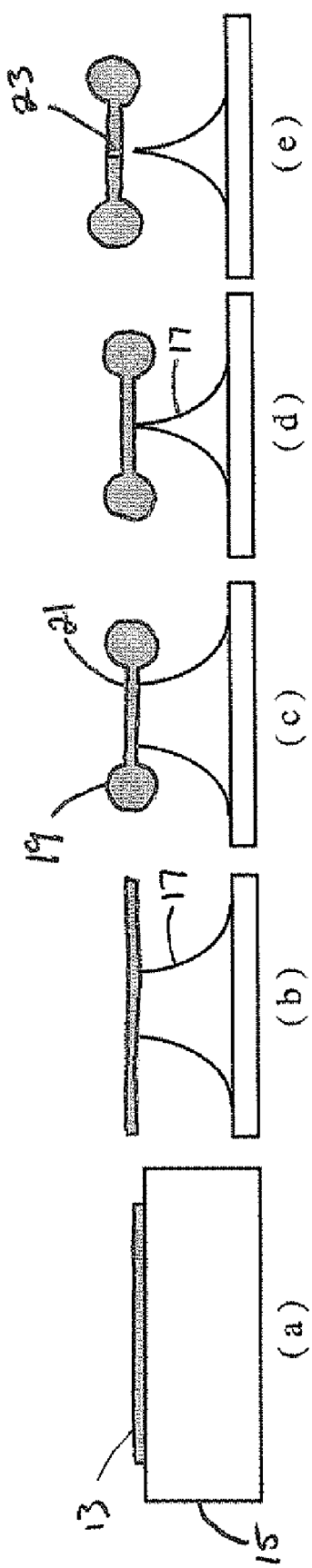
FIG. 1 graphically illustrates the process for fabricating a microresonator in a series of sectional views of silica on a substrate.

Turning in detail to the drawings, FIG. 1 illustrates the five primary steps for fabricating a free, i.e. unattached, microresonator. For purposes of example, the microresonator is shown fabricated as a microtoroid formed from silica. Those skilled in the relevant arts will recognize that these steps may be modified to fabricate microresonators having alternate forms and by using alternate materials, including using alternate materials for the substrate. In step (a), a circular shaped silica pad 13 is formed from a thin layer of thermally grown or deposited silica on a silicon substrate 15. The silica pad 13 may be constructed from thermally grown silica using standard photolithography and a buffered HF wet etching process, although other processes may also be used. The thickness of the silica pad 13 may vary depending upon the desired dimensions of the microtoroid being fabricated. In step (b), the silicon substrate 15 is formed into a pillar 17 which undercuts the silica pad 13 using an $XeF_2$ isotropic dry etching process, or an effective equivalent thereto. In step (c), the microtoroid 19 is formed from the silica pad 13 by irradiating the silica pad 13 from the top with a $CO_2$ laser beam having a Gaussian profile. The laser melts the periphery of the silica pad 13 and surface tension of the molten silicon induces formation of the microtoroid 19, the surface of which has very low roughness, on the order of less than 1 nm. A portion of the original silica pad 13 remains as a membrane 21 within the center of the microtoroid 19. The major diameter of the microtoroid is substantially determined by both the diameter of the pillar 17 and the intensity of the laser beam.

These first three steps, and variations thereof, have been described in detail in U.S. Patent Publication No. 20040179573 and U.S. Patent Publication No. 20050169331, the disclosures of which are incorporated herein by reference as if set forth in full. As has been practiced in the prior art, the diameter of the pillar 17 is frequently approximately 30% to 40% of the diameter of the silica pad 13, although the relative size between the pillar and silica pad are highly variable based upon the desired dimensions of the resulting microtoroid.

As of step (c), the microtoroid 19 is strongly attached to the pillar 17 and any attempt at mechanical detachment would likely result in severe damage to the structure of the microtoroid 19. To enable detachment with minimal damage to the microtoroid 19, in step (d) the overall diameter of the pillar 17 is reduced through a second $XeF_2$ dry etching process. Although this second dry etching process could be used to completely free the microtoroid 19 from the pillar 17, it has been found that doing so results in the freed microtoroid being caught up in the air currents resulting from the dry etching process and being severely damaged and/or lost. Thus, reducing the overall diameter of the pillar 17 to approximately 2-4 μm has been determined to be sufficient for safe mechanical detachment of the microtoroid 19 from the pillar 17. The amount the overall diameter of the pillar is reduced may be different from this range, either larger or smaller, depending upon the size of the microtoroid and the materials used in the fabrication process. The last step (e) of the process is to disengage the microtoroid 19 from the reduced diameter pillar 17.

Different techniques may be employed to disengage the microtoroid 19 from the reduced diameter pillar 17. For example, in one technique a tapered silica fiber tip is used to break the microtoroid off from the pillar through application of a vertical force to the microtoroid structure. Once the microtoroid is disengaged, Van-der-Waals forces cause it to attach to the fiber tip. A small center hole 23, typically approximately 4-6 μm if the reduced diameter pillar is between 2-4 μm, is left in the center of the membrane 21. This center hole 23 may be used later for accurate positioning of the free microtoroid within a photonics circuit. Although this technique enables disengagement of the microtoroid from the pillar, the contact between the microtoroid and the tapered silica fiber is somewhat uncontrolled, leading to a higher potential for contaminating or causing damage to the smooth sidewalls of the microtoroid. Any contamination or damage to the microtoroid can result in degradation of the Q factor. Thus, a more preferred technique for disengaging the microtoroid has been developed.

Figure 2:
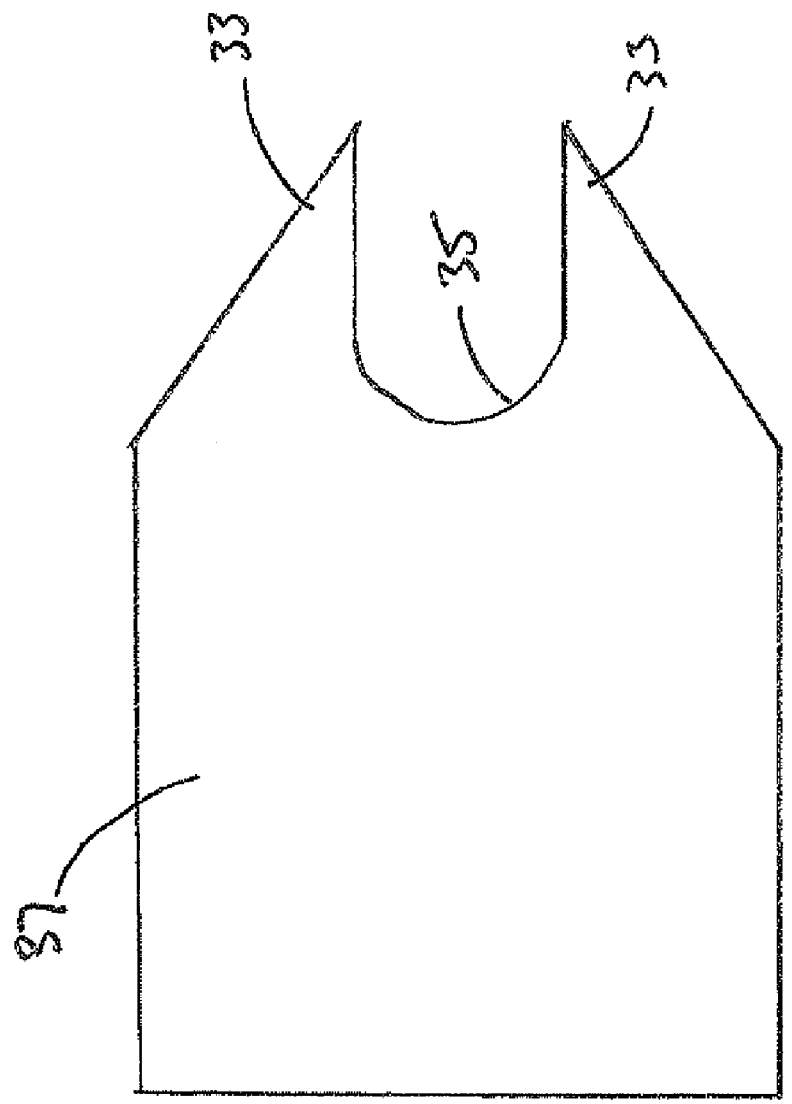
FIG. 2 is a top plan view of a tool designed to facilitate lifting a microresonator off a substrate.
Figure 3:
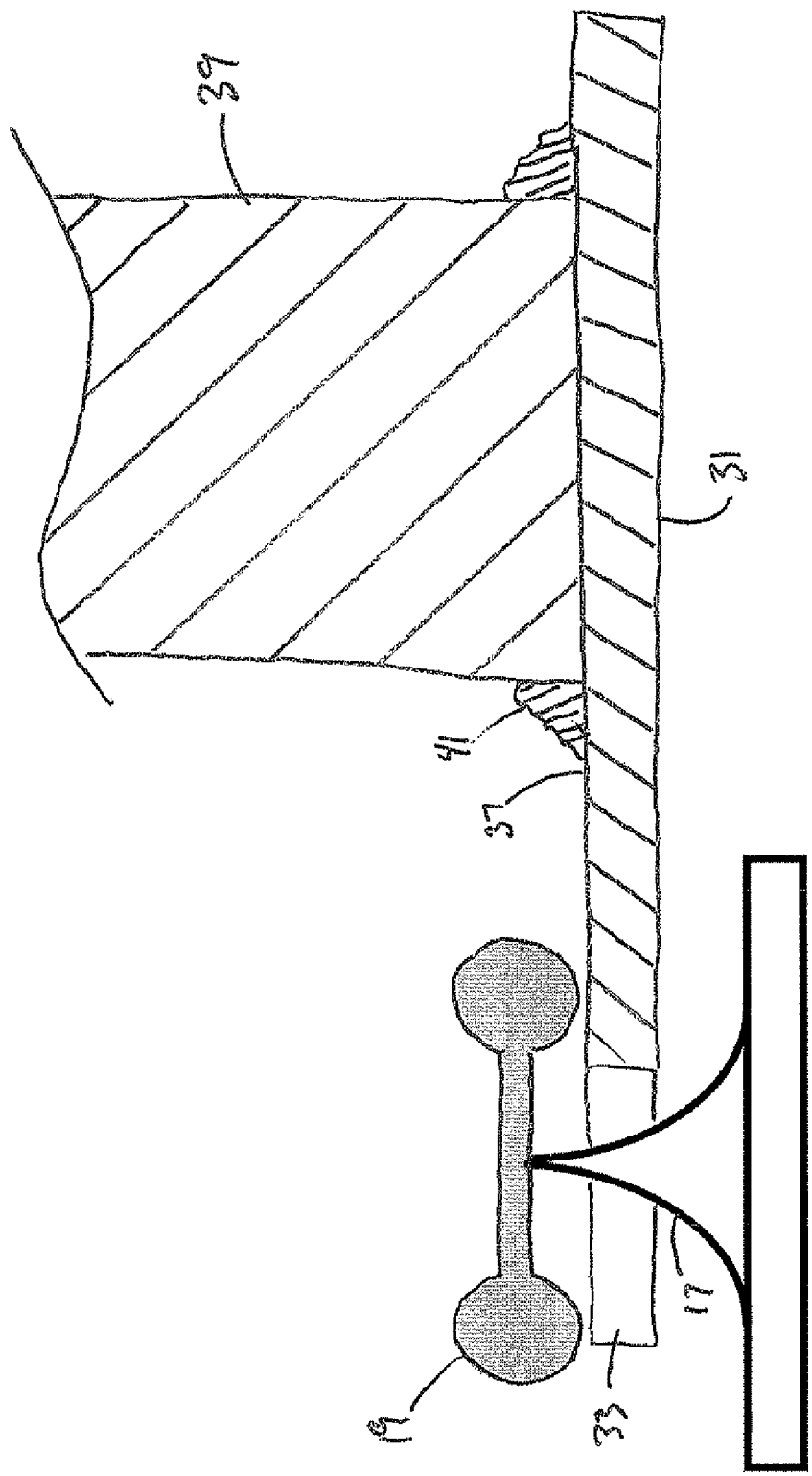
FIG. 3 is a sectional view showing the tool of FIG. 2 positioned to lift a microresonator off a substrate.

FIG. 2 illustrates a forked platform 31 which may be used to disengage the microtoroid from the pillar. The forked platform 31 includes two tines 33, which define a central gap 35, and a broad bed 37. As shown in FIG. 3, a fiber 39 may be attached to the bed 37 using an appropriate adhesive 41. The central gap 35 is sized to receive a pillar 17 of reduced diameter supporting a microtoroid 19, with the tines 33 placed on either side of the pillar 17. The size of the tines 33 depends upon the size of the microtoroids being fabricated. The platform 31 is then lifted vertically to break the silica-silicon joint between the microtoroid 19 and the pillar 17, thereby disengaging the microtoroid 19. Once the microtoroid 19 is free and resting upon the platform 31, the microtoroid 19 may be transferred off the platform 17 and placed onto a target substrate as part of an integrated optical circuit. Using this or another similar method, the side walls of the microtoroid, or at least that portion of the microtoroid in which light actively circulates, may be protected from physical contact which is likely to significantly degrade the Q factor of the microtoroid.

The forked platform 31 may be constructed from silica in much the same manner that a free microtoroid is made. A silica layer is deposited upon a silicon substrate. The thickness of the silica layer may vary, but a layer of 4 µm thickness has been found sufficient to fabricate a usable forked platform. First, the forked platform is defined in the silica through photolithography and HF etching. Next, $XeF_2$ dry etching is used to remove much of the silicon substrate, leaving a relatively narrow pillar from which the forked platform may be disengaged by application a lifting force. Next, the end of a cleaved, single-mode fiber is coated with a small amount of liquid adhesive and is brought into contact with the bed of the platform, and the adhesive is allowed to solidify. A 3-D manual micro positioning system is used to position the fiber and engage the bed of the platform. However, once this technique has been further refined, it is expected that this process will well suited to automated control. Finally, the fiber is lifted directly away from the remaining substrate, thereby disengaging the forked platform from the silicon substrate. The result is a silica platform affixed to the end of a single-mode fiber, the position of which can be controlled by the micro positioning system.

Figure 4:
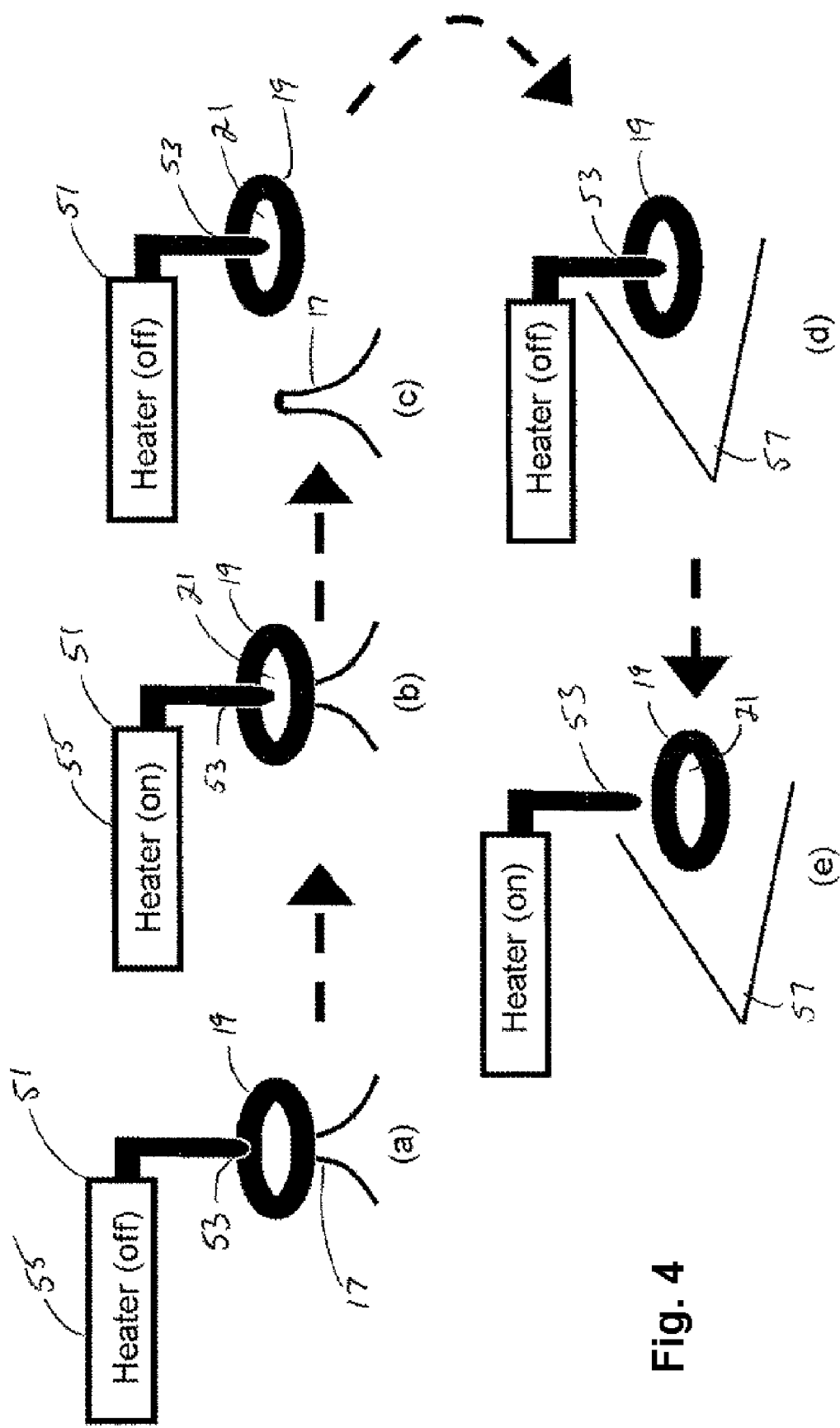
FIG. 4 illustrates the process for lifting a microresonator off a substrate using an alternative tool.

An alternative technique and tool for disengaging the microresonator from the pillar is illustrated in FIG. 4. In step (a), the microtoroid 19 is shown following fabrication on top of the pillar 17. A tool 51 is positioned above the microtoroid 19 using an appropriate micro-positioning system (not shown). The tool 51 includes a micrometer-sized heatable tip 53 connected to a heating system 55 appropriate for the type of tip used. Preferably, the tip 53 is a tungsten tip that is electrically heated. The tip 53 is coated with an adhesive which is heat activated. Upon application of heat, the adhesive activates and becomes soft and sticky, and when the heat is turned off, the adhesive hardens to bond surfaces it is in contact with. An appropriate adhesive is available from Aremco Products, Inc., of Valley Cottage, N.Y., sold under the trade name of Crystalbond™ as Product Nos. 509, 555, 555-HMP, or 590. Although any of these products may be used due to their heat activation property and the ability to wash the adhesive away with a solvent without leaving a residue, the adhesives with a lower heat activation requirement and soluble with water are preferred.

In the next step (b), the coated tip 53 of the tool 51 is positioned in contact with the center membrane 21 of the microtoroid 19, preferably close to the center of the microtoroid 19. The tip 53 is then heated by the heating system 55 to activate the adhesive. The tip 53 heating is then deactivated so that the adhesive can cool and bond the tip 53 to the central membrane 21 of the microtoroid 19. With the tip 53 bonded to the central membrane 21, in the next step (c) the tool 51 is raised to lift the microtoroid 19 and disengage it from the pillar 17. With the microtoroid 19 free of the pillar 17, the micropositioning system may be employed in an additional step (d) to place the microtoroid 19 in a desired position as part of an integrated photonics circuit 57. Once the microtoroid 19 is in the desired position, in the last step (e), the tip 53 is once again heated to activate the adhesive, thus debonding the tip 53 from the central membrane 21 and permitting the tip 53 to be withdrawn from the microtoroid 19. On the integrated photonics circuit 57, the microtoroid 19 may be secured using any desirable and appropriate technique.

Once a free microtoroid has been fabricated, fiber-taper coupling techniques may be used to measure and verify the Q factor of the microtoroid. It has been found that, at a wavelength of 1550 nm, a microtoroid fabricated in the lab had an unloaded Q factor of about $5.2 \times 10^7$ prior to detachment from the pillar, and an unloaded Q factor of about $3.1 \times 10^7$. Although the Q factor of the free microtoroid is degraded by almost 40%, the final Q factor is still above 10 million. It is believed that the primary cause of the degradation is contamination from the lab environment (as opposed to a clean room environment).

Free microtoroids may be coupled into nearly any type of photonic device, and may be placed on nearly any type of substrate or surface. For example, the position of a free microtoroid may be secured on a substrate by using UV curable epoxy. The epoxy adheres to the substrate and extends through the hole created in the center membrane of the microtoroid. When the free microtoroid is placed on a surface, with the toroid itself resting on the surface, a microtoroid having a larger minor diameter is anticipated to be more desirable to avoid interaction between the optical mode and the surface. Conversely, when the free microtoroid is place on a pedestal structure, the minor diameter of the microtoroid is less important.

Precise positioning of the microtoroid on the substrate may be controlled with nanometer accuracy using special tips controlled by positioning systems. This enables free microtoroids to be optically coupled to fibers, to other microtoroids, and to waveguides. The free microtoroids might also be placed on temperature controlled pads which enable resonant frequency tuning of the microtoroids.

Thus, a method of fabricating a microresonator is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of fabricating a microresonator, the method comprising:
   forming a silica layer on a substrate;
   etching the substrate to form a pillar having a top portion supporting the silica layer, wherein the top portion is dimensioned smaller than the silica layer;
   forming a microresonator from the silica layer;
   etching the pillar to reduce an overall diameter of the top portion of the pillar; and
   disengaging the microresonator from the pillar.

2. The method of claim 1, wherein the substrate comprises a silicon substrate.

3. The method of claim 1, wherein etching the substrate includes etching the silicon substrate using an $XeF_2$ dry etching process.

4. The method of claim 1, wherein forming the microresonator includes irradiating the silica layer to melt a periphery of the silica layer and to induce formation of a microtoroid.

5. The method of claim 1, wherein etching the pillar includes etching the pillar using an $XeF_2$ dry etching process.

6. The method of claim 1, wherein etching the pillar includes reducing the overall diameter of the top portion to less than 4 µm.

7. The method of claim 1, wherein disengaging the microresonator includes breaking the microresonator away from the top portion of the pillar.

8. The method of claim 1, wherein disengaging the microresonator includes lifting the microresonator off the pillar.

9. The method of claim 8, wherein lifting the microresonator includes:
placing a tool underneath the microresonator; and
lifting the microresonator with the tool.

10. The method of claim 9, wherein the tool comprises forked platform.

11. The method of claim 9, wherein the tool is formed from silica.

12. The method of claim 8, wherein lifting the microresonator includes:
adhering a tip of a tool to a center membrane of the microresonator; and
lifting the microresonator with the tool.

13. The method of claim 12, wherein adhering the tip of the tool to the center membrane comprises:
placing a tip of a tool in contact with a center membrane of the microresonator, wherein the tip is coated with a thermally activated adhesive;
activating heating of the tip to soften the adhesive; and
deactivating heating of the tip to harden the adhesive and bond the center membrane of the microresonator to the tip.

14. The method of claim 13, wherein the tip comprises a tungsten tip.

15. The method of claim 13, wherein activating heating includes activating resistive heating in the tip.

16. The method of claim 13, after lifting the microresonator, further comprising:
activating heating of the tip to soften the adhesive; and
detaching the microresonator from the tip.

17. A method of fabricating a microtoroid, the method comprising:
forming a silica microdisk on a silicon substrate;
etching the silicon substrate to form a pillar supporting the silica microdisk, wherein the top portion is smaller than the microdisk;
irradiating the silica microdisk to melt a periphery of the silica microdisk and to induce formation of a microtoroid;
etching the pillar to reduce an overall diameter of the top portion of the pillar; and
disengaging the microtoroid from the pillar.

18. The method of claim 17, wherein etching the silicon substrate includes etching the silicon substrate using an $XeF_2$ dry etching process.

19. The method of claim 17, wherein etching the pillar includes etching the pillar in using an $XeF_2$ dry etching process.

20. The method of claim 17, wherein etching the pillar includes forming a joint between the pillar and the microtoroid, the joint being less than 4 µm in diameter.

21. The method of claim 20, wherein disengaging the microtoroid includes breaking the joint.

22. The method of claim 17, wherein disengaging the microtoroid includes lifting the microtoroid off the pillar.

23. The method of claim 22, wherein lifting the microtoroid includes:
placing a tool underneath the microtoroid; and
lifting the microtoroid with the tool.

24. The method of claim 23, wherein the tool comprises forked platform.

25. The method of claim 23, wherein the tool is formed from silica.

26. The method of claim 22, wherein lifting the microresonator includes:
adhering a tip of a tool to a center membrane of the microresonator; and
lifting the microresonator with the tool.

27. The method of claim 26, wherein adhering the tip of the tool to the center membrane comprises:
placing a tip of a tool in contact with a center membrane of the microresonator, wherein the tip is coated with a thermally activated adhesive;
activating heating of the tip to soften the adhesive; and
deactivating heating of the tip to harden the adhesive and bond the center membrane of the microresonator to the tip.

28. The method of claim 27, wherein the tip comprises a tungsten tip.

29. The method of claim 27, wherein activating heating includes activating resistive heating in the tip.

30. The method of claim 27, after lifting the microresonator, further comprising:
activating heating of the tip to soften the adhesive; and
detaching the microresonator from the tip.

* * * * *